US006752127B2

(12) United States Patent
Mori

(10) Patent No.: US 6,752,127 B2
(45) Date of Patent: Jun. 22, 2004

(54) ACCUMULATOR VESSEL AND METHOD OF MANUFACTURING THE SAME

(75) Inventor: Katsumi Mori, Chiryu (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/283,109

(22) Filed: Oct. 30, 2002

(65) Prior Publication Data

US 2003/0084881 A1 May 8, 2003

(30) Foreign Application Priority Data

Nov. 6, 2001 (JP) ....................................... 2001-340380

(51) Int. Cl.[7] .......................... F02M 55/00; B23P 11/02
(52) U.S. Cl. .......................... 123/456; 123/468; 138/89
(58) Field of Search ................................. 123/456, 468, 123/469; 138/89

(56) References Cited

U.S. PATENT DOCUMENTS 2,855,003 A * 10/1958 Thaxton ...................... 138/89
3,550,636 A * 12/1970 Hearne ........................ 138/89
3,983,904 A * 10/1976 Laviano ....................... 138/89
4,570,602 A * 2/1986 Atkins et al. ............... 123/468
4,584,755 A * 4/1986 Lundquist .................... 138/89
4,844,152 A * 7/1989 Hummert ...................... 138/89
5,062,405 A * 11/1991 Daly .......................... 123/468
5,411,001 A * 5/1995 Werner et al. .............. 123/456
5,513,613 A * 5/1996 Taylor et al. ............... 123/456
5,603,302 A 2/1997 Minagawa et al.
6,488,011 B1 * 12/2002 Frank et al. ................ 123/456

FOREIGN PATENT DOCUMENTS

JP A-10-160083 6/1998
JP 2002-36448 12/2002
WO WO 01/09507 A1 2/2001

* cited by examiner

*Primary Examiner*—Thomas N. Moulis
(74) *Attorney, Agent, or Firm*—Nixon & Vanderhye P.C.

(57) ABSTRACT

A body member of a common rail is formed with an accumulator chamber hole that is a through hole providing first and second openings on both ends of the body member. A sealing plug is inserted into the accumulator chamber hole from the second opening and is press-fitted into a reduced diameter part of the accumulator chamber hole so far as the sealing plug contacts a contacting part near the first opening. Thus, the sealing plug closes the first opening. When high-pressure fuel is accumulated in the accumulator chamber, the sealing plug is pressed against the contacting part. Accordingly, the sealing plug and the contacting part are adhered with each other tightly. Therefore, leak of the fuel is surely prevented.

20 Claims, 5 Drawing Sheets

ACCUMULATOR VESSEL AND METHOD OF MANUFACTURING THE SAME

CROSS REFERENCE TO RELATED APPLICATION

This application is based on and incorporates herein by reference Japanese Patent Application No. 2001-340380 filed on Nov. 6, 2001.

BACKGROUND OF THE INVENTION

1. Field of the Invention

The present invention relates to an accumulator vessel in which high-pressure fuel is accumulated in a pressurized state and relates to a method of manufacturing the accumulator vessel.

2. Description of Related Art

A known common rail type fuel injection device for an internal combustion engine, which is referred to as an engine hereafter, accumulates fuel pressurized by a fuel injection pump in an accumulator vessel. The high-pressure fuel accumulated in the accumulator vessel is supplied to a plurality of injectors disposed in correspondence with a plurality of cylinders and is injected to combustion chambers. The injectors are connected with an accumulator chamber formed inside the accumulator vessel by fuel pipes respectively.

Usually, the cylinders are arranged in a straight line. Therefore, the accumulator vessel is formed in a shape of a tube extending along the cylinders to facilitate distribution of the fuel to the respective cylinders. Since the accumulator chamber is supplied with very high-pressure fuel, the accumulator vessel is required to be highly reliable. Therefore, in a method of manufacturing the accumulator vessel, an accumulator chamber hole that provides the accumulator chamber is formed inward from both ends of a rod-shaped member by cutting and the like. In order to ensure fluid-tightness of the accumulator chamber, the accumulator chamber hole is sealed by sealing members attached to both ends of the accumulator chamber hole from the outside of the accumulator vessel.

In the above conventional accumulator vessel, the sealing members are attached to both ends of the accumulator chamber hole by screwing and the like.

However, the sealing members receive forces from the fuel in the accumulator chamber in directions opposite to the screwing directions, since the pressure in the accumulator chamber is very high. Therefore, in order to prevent leak of the fuel from the accumulator chamber and to improve reliability of the accumulator vessel, the screwing torque of the sealing members should be controlled and the connected portions of the accumulator vessel should be machined precisely.

On the other hand, it may be applicable to form a cavity that provides the accumulator chamber from one of the ends of the rod-shaped member by cutting and the like. However, cleaning solution for cleaning the inside of the rod-shaped member is not capable of flowing sufficiently, since only one end of the rod-shaped member is open. Therefore, it is difficult to remove burrs or contaminants produced in the machining.

SUMMARY OF THE INVENTION

It is therefore an object of the present invention to provide an accumulator vessel that is easy to clean and is highly reliable.

It is another object of the present invention to provide a method of manufacturing an accumulator vessel that is easy to clean and to assemble.

In an accumulator vessel according to an aspect of the present invention, a sealing member contacts a contacting part formed near a first end of a body member from a second end side. When high-pressure fuel is accumulated in an accumulator chamber hole, the sealing member is biased by the high-pressure fuel toward the contacting part. Accordingly, the sealing member and the contacting part are adhered with each other tightly, so that fluid-tightness is easily ensured without requiring control of screwing force of the sealing member, for instance. Therefore, leak of the fuel from the accumulator chamber is prevented and the reliability of the accumulator vessel is improved. In addition, an accumulator chamber hole interconnects a first opening on the first end of the body member and a second opening on the second end of the body member. Therefore, the cleaning solution flows freely through the accumulator chamber hole and an inside of the accumulator chamber hole is cleaned easily.

In a method of manufacturing an accumulator vessel according to another aspect of the present invention, an accumulator chamber hole is formed, and then, the inside of the accumulator chamber hole is cleaned. Since the accumulator chamber hole interconnects a first opening formed on a first end of a rod-shaped member and a second opening formed on a second end of the rod-shaped member, cleaning solution flows freely through the accumulator chamber hole. Accordingly, the inside of the accumulator chamber hole is cleaned easily, and burrs and contaminants produced in machining of the accumulator chamber hole are removed. A sealing member is inserted into the accumulator chamber hole from the second opening and is fastened so that the sealing member contacts a contacting part formed in the accumulator chamber hole near the first opening. Since the sealing member is merely inserted and fastened to the accumulator chamber hole, control of a screwing torque, for instance, is not required. Therefore, the sealing member is easily attached.

BRIEF DESCRIPTION OF THE DRAWINGS

Features and advantages of embodiments will be appreciated, as well as methods of operation and the function of the related parts, from a study of the following detailed description, the appended claims, and the drawings, all of which form a part of this application. In the drawings:

DETAILED DESCRIPTION OF THE REFERRED EMBODIMENT (First Embodiment)

Figure 2:
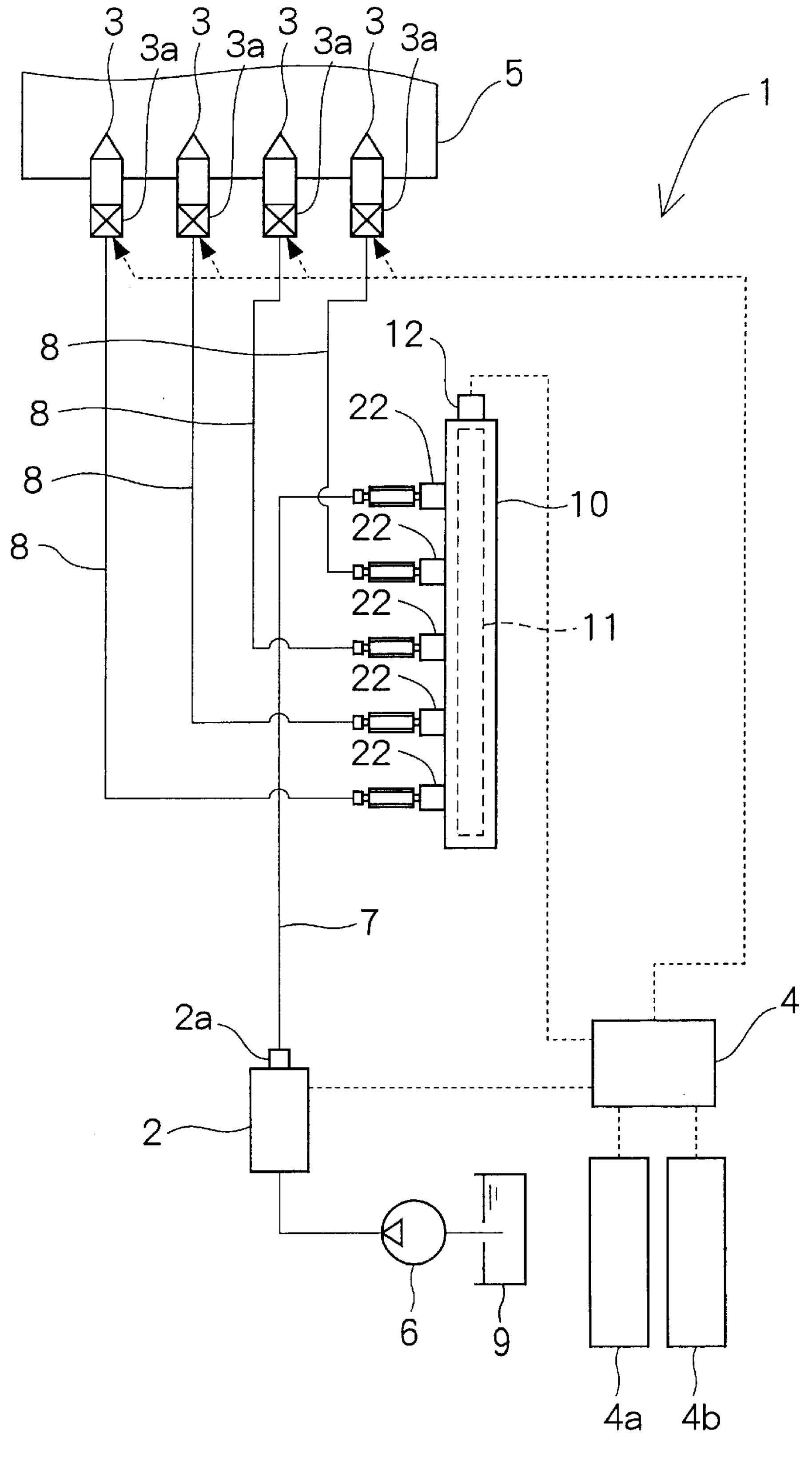
FIG. 2 is a schematic diagram showing a fuel injection system that employs the common rail according to the first embodiment of the present invention.

As shown in FIG. 2, a common rail type fuel injection system 1 comprises a common rail 10 as an accumulator vessel, a fuel injection pump 2, injectors 3 and an engine control unit 4. The fuel injection system 1 supplies fuel to a four-cylinder diesel engine 5, which is referred to as an engine 5 hereafter.

A low-pressure pump 6 supplies fuel from a fuel tank 9 to the fuel injection pump 2. The fuel injection pump 2 pressurizes the fuel to a predetermined pressure. The fuel injection pump 2 supplies the fuel to an accumulator chamber 11 of the common rail 10 through a discharge valve 2*a* and a fuel pipe 7. Thus, the fuel pressurized to a predetermined pressure is accumulated in the accumulator chamber 11 in a pressurized state.

The injectors 3 are disposed in correspondence with a plurality of cylinders of the engine 5 respectively and are connected with the common rail 10 common to the respective cylinders. When an electromagnetic valve 3*a* of the injector 3 is open, the high-pressure fuel accumulated in the accumulator chamber 11 is supplied to the injector 3 and is injected to the corresponding cylinder. Timing and quantity of the fuel injection are controlled by turning on and off of the electromagnetic valves 3*a*.

The fuel injection system 1 is controlled by the engine control unit 4. The engine control unit 4 is connected with a rotation speed sensor 4*a* and a load sensor 4*b*, for instances. The engine control unit 4 computes the optimum timing and quantity, duration, of the fuel injection in correspondence with operating conditions of the engine 5, based on inputted information on rotation speed and load of the engine. The engine control unit 4 outputs control signals to control the switching on and off of the electromagnetic valves 3*a* based on the computed timing and quantity of the injection. The common rail 10 has a pressure sensor 12 for detecting the pressure of the fuel in the accumulator chamber 11. The engine control unit 4 controls the discharge rate of the fuel injection pump 2 based on signals outputted by the pressure sensor 12, the rotation speed, the load and the like so that the pressure in the accumulator chamber 11 is equal to the optimum value.

Figure 1:
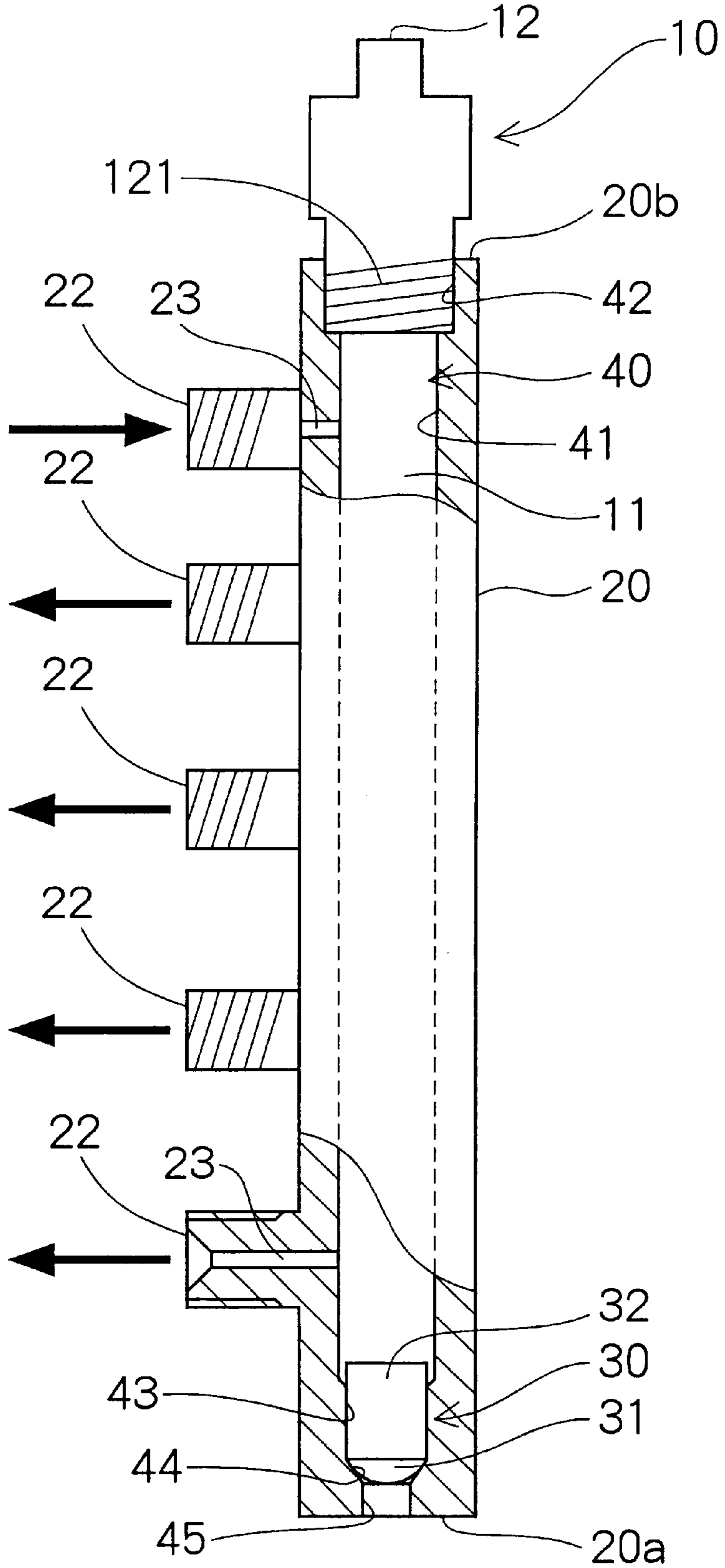
FIG. 1 is a schematic partial sectional view showing a common rail according to a first embodiment of the present invention.

As shown in FIG. 1, the common rail 10 comprises a body member 20 and a sealing plug 30 as a sealing member. Arrow marks in FIG. 1 show the flow of the fuel. The body member 20 is formed in the shape of a tube. An accumulator chamber hole 40 is formed inside the body member 20. The body member 20 is formed with a plurality of branching parts 22 perpendicular to an axis of the body member 20. In a case in which the common rail 10 is applied to the four-cylinder engine 5 like this embodiment, the common rail 10 is formed with five branching parts 22. The branching parts 22 are formed with fuel passages 23 inside. The fuel passages 23 interconnect with the accumulator chamber 11. One of the branching parts 22 is connected with the fuel pipe 7 that is connected with the fuel injection pump 2 as shown in FIG. 2. The other branching parts 22 are connected with fuel pipes 8 that are connected with the injectors 3 mounted in the respective cylinders of the engine 5.

As shown in FIG. 1, the accumulator chamber hole 40 is a through hole that provides a first opening on a first end 20*a* of the body member 20 and a second opening on a second end 20*b* of the body member 20. The accumulator chamber hole 40 is formed with a female screw part 42, a large diameter part 41, a reduced diameter part 43, a contacting part 44 and a small diameter part 45, in that order along an axis of the accumulator chamber hole 40 from the second end 20*b* to the first end 20*a*. The female screw part 42 is formed in the second end 20*b* of the body member, and an inner peripheral surface thereof is threaded. The large diameter part 41 is formed in connection with the female screw part 42, occupying a great part of the total length of the accumulator chamber hole 40. The large diameter part 41 interconnects with the fuel passages 23. The reduced diameter part 43 is formed next to the large diameter part 41 and has a slightly smaller internal diameter than the large diameter part 41. The contacting part 44 is formed in connection with the reduced diameter part 43 and is formed in the shape of a truncated conical surface. The small diameter part 45 is formed in connection with the contacting part 44 in the first end 20*a* of the body member and has a smaller diameter than the reduced diameter part 43.

A sealing plug 30 is disposed in the first end 20*a* of the body member 20. The sealing plug 30 is constructed with a sealing part 31 and a restraining part 32 integrally. The sealing part 31 has a spherical surface that contacts the contacting part 44 from the second end 20*b* side so that the sealing part 31 seals between the sealing plug 30 and the small diameter part 45. Thus, the sealing plug 30 closes the first opening of the accumulator chamber hole 40 from within. The restraining part 32 is formed in the shape of a column and is press-fitted into the reduced diameter part 43 to restrain the movement of the sealing part 31 in a direction opposite to the contacting part 44. Thus, the contact between the sealing part 31 and the contacting part 44 is ensured. The restraining part 32 is formed so that an external diameter thereof is not smaller than an internal diameter of the reduced diameter part 43. Length of the restraining part 32 along the axis of the body member 20 is longer than that of the reduced diameter part 43. Therefore, the restraining part 32 protrudes in the large diameter part 41 and the press-fitted portion of the restraining part 32 is not exposed.

The pressure sensor 12 is disposed in the second end 20*b* of the body member 20. The pressure sensor 12 detects the pressure of the fuel accumulated in the accumulator chamber 11 and outputs the pressure value to the engine control unit 4. The pressure sensor 12 has a male screw part 121, which is screwed with the female screw part 42. Thus, the pressure sensor 12 is disposed in the second end 20*b* of the body member by screwing and closes the second opening on the second end 20*b*.

Figure 3:
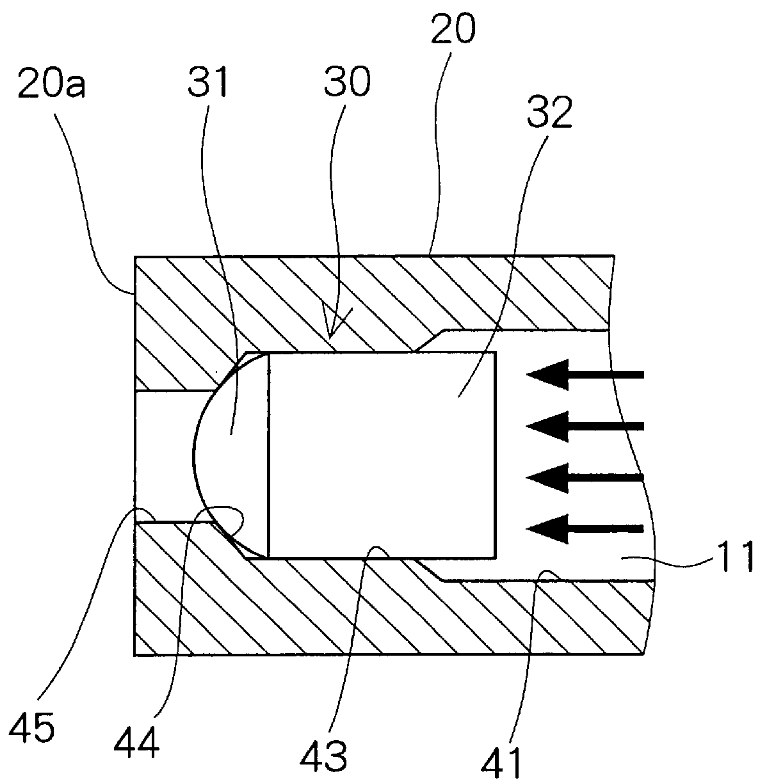
FIG. 3 is a schematic sectional view showing an end of the common rail in a sealing member side according to the first embodiment of the present invention.

The accumulator chamber 11 is a space provided by the pressure sensor 12, the sealing plug 30 and the inner peripheral surface of the accumulator chamber hole 40. When the fuel is accumulated in the accumulator chamber 11, the pressure of the fuel acts vertically on surfaces forming the accumulator chamber 11. More specifically, the pressure of the fuel acts vertically on an inner peripheral surface of the body member 20, respective end surfaces of the pressure sensor 12 and the sealing plug 30 in the accumulator chamber 11 side. Therefore, the sealing plug 30 is biased toward the contacting part 44 as shown by arrow marks in FIG. 3. Accordingly, the sealing part 31 is pressed against the contacting part 44, so that the sealing part 31 and the contacting part 44 are adhered with each other tightly. As a result, sealing performance between the sealing part 31 and the contacting part 44 is improved. In addition, the movement of the sealing plug 30 toward the small diameter part 45 is restrained by the contacting part 44. Therefore, the pressure of the fuel compresses the sealing plug 30 in an axial direction. Accordingly, the sealing plug 30 is enlarged radially outward, and the restring part 32 is adhered to the reduced diameter part 43 tightly. Thus, sealing efficiency between the restraining part 32 and the reduced diameter part 43 is improved. As a result, the leak of the fuel from the accumulator chamber 11 is surely prevented.

Thus, the reliability of the common rail 10 is improved with a simple structure, without requiring precise control of the force applied to the sealing plug 30 when the sealing plug 30 is press-fitted into the reduced diameter part 43.

A method of manufacturing the common rail 10 will be explained below, based on FIGS. 4A to 4D.

Figure 4A:
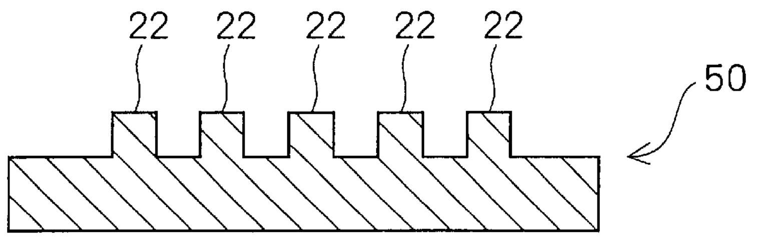
FIG. 4A is an explanatory diagram showing a machining and cleaning step of manufacturing the common rail according to the first embodiment of the present invention.
Figure 4B:
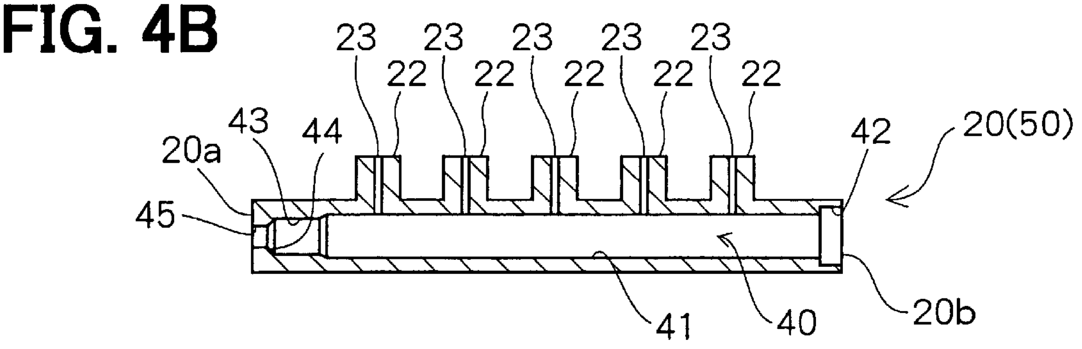
FIG. 4B is another explanatory diagram showing the machining and cleaning step of manufacturing the common rail according to the first embodiment of the present invention.

1. Machining and Cleaning Step:

A rod member 50 that becomes the body member 20 of the common rail 10 is provided with branching parts 22 integrally in advance as shown in FIG. 4A. The accumulator chamber hole 40 is formed inward from both ends of the rod member 50 by drilling and the like as shown in FIG. 4B. When the accumulator chamber hole 40 is formed, the reduced diameter part 43, the contacting part 44 and the small diameter part 45 are formed near the first end 20*a*, and the female screw part 42 is formed near the second end 20*b*.

After the accumulator chamber hole 40 is formed, the fuel passages 23 that interconnect the accumulator chamber hole 40 and the ends of the branching parts 22 are formed. The fuel passages 23 are formed by drilling and the like, as is the case with the accumulator chamber hole 40. Alternatively, the fuel passages 23 may be formed before the accumulator chamber hole 40 is formed.

After the accumulator chamber hole 40 and the fuel passages 23 are formed, the inside of the rod member 50 is cleaned. The inside of the rod member 50 is cleaned by pouring cleaning solution through the accumulator chamber hole 40 and the fuel passages 23, for instance. In that case, the cleaning solution flows through the accumulator chamber hole 40. The burrs, cutting debris and the like that are produced when the accumulator chamber hole 40 and the fuel passages 23 are formed are removed by cleaning. Thus, the body member 20 of the common rail 10 is formed.

Figure 4C:
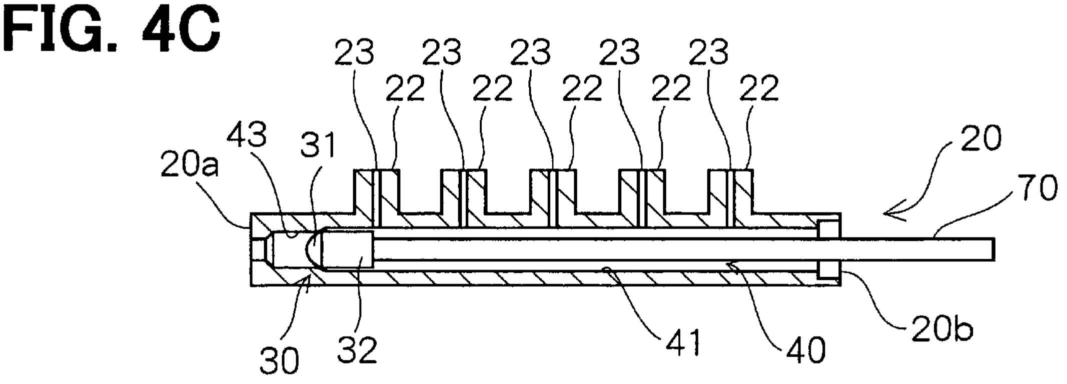
FIG. 4C is an explanatory diagram showing a sealing step of manufacturing the common rail according to the first embodiment of the present invention.

2. Sealing Step:

After the body member 20 is formed, the sealing plug 30 is disposed in the first end 20*a* of the body member 20. The sealing plug 30 is inserted into the accumulator chamber hole 40 from the second opening on the second end 20*b*. The sealing plug 30 is formed so that the external diameter thereof is not smaller than the internal diameter of the reduced diameter part 43. Accordingly, the sealing plug 30 stops at the reduced diameter part 43 in the large diameter 41 side as shown in FIG. 4C. Therefore, the sealing plug 30 is pressed by a pressing device 70 from the large diameter part 41 side and is press-fitted into the reduced diameter part 43 so far as the sealing part 31 contacts the contacting part 44.

Figure 4D:
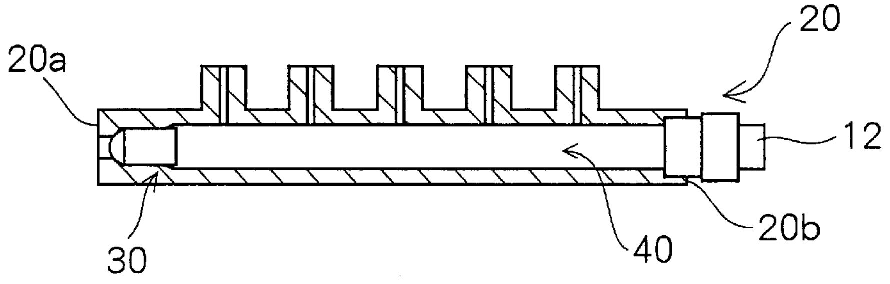
FIG. 4D is another explanatory diagram showing the sealing step of manufacturing the common rail according to the first embodiment of the present invention.

After the sealing plug 30 is disposed in the first end 20*a* of the body member 20, the pressure sensor 12 is disposed in the second end 20*b* of the body member 20 as shown in FIG. 4D. The pressure sensor 12 is screwed into the body member 20 as explained above, and seals the accumulator chamber hole 40.

In the first embodiment, the sealing plug 30 is merely press-fitted into the first end 20*a* from the second end 20*b* of the accumulator chamber hole 40. Thus, the common rail 10 is easily assembled. Moreover, the accumulator chamber hole 40 formed in the body member 20 interconnects the first opening formed on the first end 20*a* and the second opening formed on the second end 20*b*. Therefore, cleaning solution is capable of flowing through the accumulator chamber hole 40 and the accumulator chamber hole 40 is cleaned easily. Accordingly, contaminants in the accumulator chamber hole 40 are easily removed. Thus, efficiency of cleaning the common rail 10 is improved.

(Modification of the First Embodiment)

Figure 6:
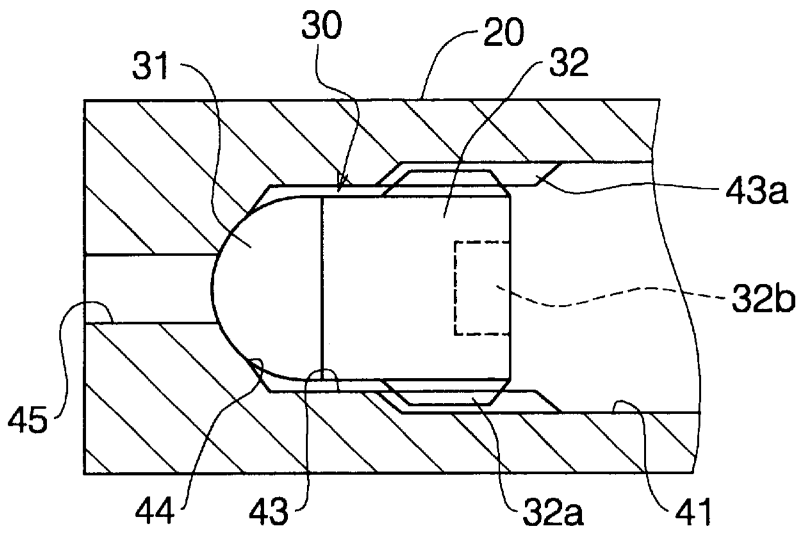
FIG. 6 is a schematic sectional view showing an end of a common rail in a sealing member side according to a modification of the first embodiment of the present invention.

In the first embodiment, the restraining part 32 of the sealing plug 30 is press-fitted into the reduced diameter part 43. Alternatively, as shown in FIG. 6, a female screw part 43*a* may be formed in the reduced diameter part 43 and a male screw part 32*a* may be formed in the restraining part 32, and the sealing plug 30 may be screwed into the body member 20. In this case, the restraining part 32 is formed with a slot 32*b* in the second end 20*b* side thereof. The restraining part 32 is screwed into the reduced diameter part 43 by a tool inserted in the slot 32*b*. Thus, the sealing plug 30 is easily disposed in the body member 20, and the movement of the sealing part 31 in a direction opposite to the contacting part 44 is restrained, so that the fluid-tightness of the accumulator chamber 11 is ensured.

(Second Embodiment)

Figure 5:
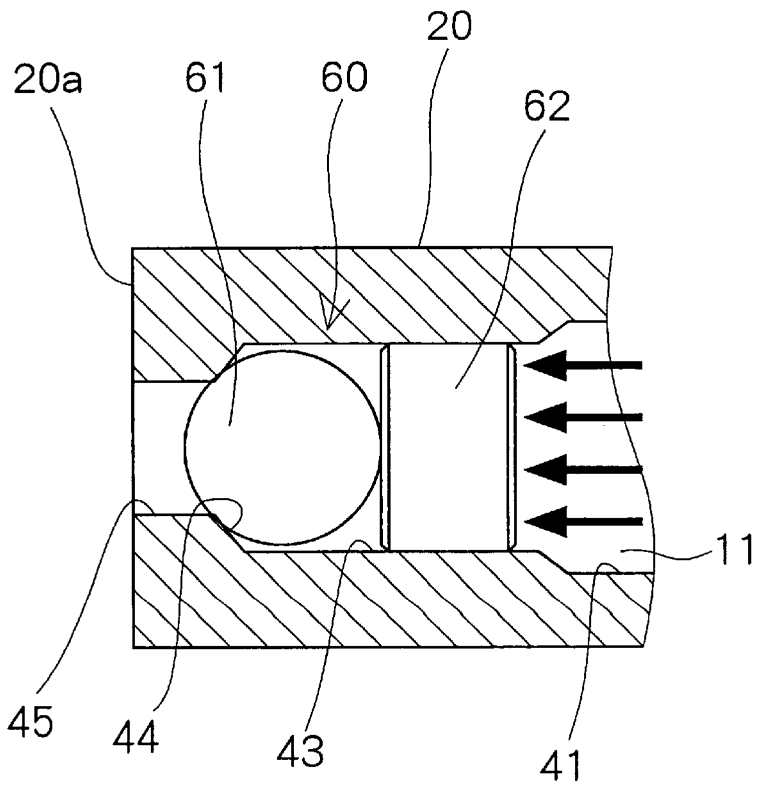
FIG. 5 is a schematic sectional view showing an end of a common rail in a sealing member side according to a second embodiment of the present invention.

In the second embodiment shown in FIG. 5, a sealing part and a restraining part of a sealing member are formed separately, differently from the first embodiment. As shown in FIG. 5, a sealing member 60 is constructed with a sphere member 61 as a sealing part and a press-fitted body 62 as a restraining part. The sphere member 61 having a spherical surface contacts a contacting part 44, which is formed in the shape of a truncated conical surface, of the accumulator chamber hole 40. The press-fitted body 62 is formed in the shape of a column and is press-fitted into a reduced diameter part 43 of the accumulator chamber hole 40 to restrain the movement of the sphere member 61 in a direction opposite to the contacting part 44. Thus, the contact between the sphere part 61 and the contacting part 44 is ensured.

The movement of the sphere member 61 in an axial direction is restrained by the press-fitted body 62 in a state in which the sphere member 61 is in contact with the contacting part 44. When high-pressure fuel is accumulated in an accumulator chamber 11, the press-fitted body 62 receives a force from the high-pressure fuel toward the sphere member 61 as shown by arrow marks in FIG. 5. Therefore, the sphere member 61 is pressed against the contacting part 44 by the press-fitted member 62, and the sphere member 61 and the contacting part 44 are adhered with each other tightly. Thus, the sealing performance between the sphere member 61 and the contacting part 44 is improved. In addition, the sphere member 61 restrains the movement of the press-fitted member 62 toward the contacting part 44. Accordingly, the press-fitted body 62 receives a force in a direction to compress the press-fitted body 62. Therefore, the press-fitted body 62 is enlarged radially outward, so that the press-fitted body 62 is adhered to the reduced diameter part 43 tightly. Thus, the sealing performance between the press-fitted body 62 and the reduced diameter part 43 is improved. As a result, the leak of the fuel from the accumulator chamber 11 is surely prevented.

In the second embodiment, the reliability of the common rail 10 is improved with a simple structure, like the first embodiment. In addition, in the second embodiment, an inexpensive existing sphere member 61 may be used as the sealing part. Moreover, the restraining member 62 may be formed in the shape of a simple column. Therefore, unit cost of the sealing member is reduced.

(Modification of the Second Embodiment)

Figure 7:
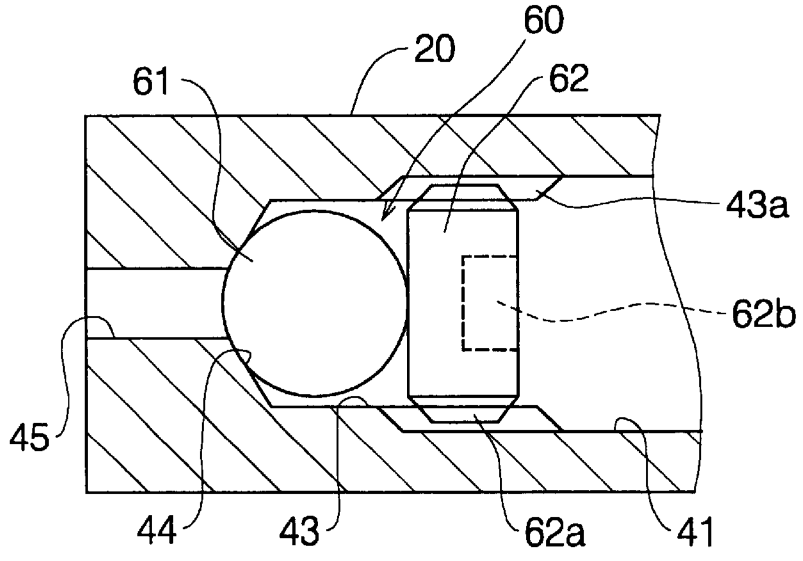
FIG. 7 is a schematic sectional view showing an end of a common rail in a sealing member side according to a modification of the second embodiment of the present invention.

In the second embodiment, the press-fitted body 62 is press-fitted into the reduced diameter part 43. Alternatively, as shown in FIG. 7, a female screw part 43*a* may be formed in the reduced diameter part 43 and a male screw part 62*a* may be formed in the press-fitted body 62, and the press-fitted body 62 may be screwed into the body member 20. In this case, the press-fitted body 62 is formed with a slot 62*b* in the second end 20*b* side thereof. The press-fitted body 62 is screwed into the reduced diameter part 43 by a tool inserted in the slot 62*b*. Thus, the sealing member 60 is easily disposed in the body member 20, and the movement of the sphere member 61 in a direction opposite to the contacting part 44 is restrained, so that the fluid-tightness of the accumulator chamber 11 is ensured.

The present invention should not be limited to the disclosed embodiments, but may be implemented in many other ways without departing from the spirit of the invention.

What is claimed is:

1. An accumulator vessel comprising:

a body member that has a first end and a second end and is formed with an accumulator chamber hole therein, wherein the accumulator chamber hole is a through hole providing a first opening on the first end and a second opening on the second end and the accumulator chamber hole is formed with a contacting part near the first opening; and a sealing member that contacts the contacting part in a direction from the second opening to the first opening so that the sealing member closes the first opening of the accumulator chamber hole.

2. The accumulator vessel as in claim 1, wherein the sealing member comprises a sealing part having a spherical surface that contacts the contacting part.

3. The accumulator vessel as in claim 2, wherein the sealing member comprises a restraining part that restrains movement of the sealing part in a direction opposite to the contacting part.

4. The accumulator vessel as in claim 3, wherein the sealing part and the restraining part are formed integrally.

5. The accumulator vessel as in claim 3, wherein the sealing part and the restraining part are formed separately.

6. The accumulator vessel as in claim 5, wherein the sealing part is formed in the shape of a sphere.

7. The accumulator vessel as in claim 1, wherein the sealing member is press-fitted into the body member.

8. The accumulator vessel as in claim 1, wherein the sealing member is screwed into the body member.

9. A method of manufacturing an accumulator vessel, the method comprising:

a machining and cleaning step of forming an accumulator chamber hole that is a through hole providing a first opening on a first end of a rod member and a second opening on a second end of the rod member, forming a contacting part in the accumulator chamber hole near the first opening, and cleaning an inside of the accumulator chamber hole; and a sealing step of inserting a sealing member into the accumulator chamber hole from the second opening and fastening the sealing member into the first end of the rod member so that the sealing member contacts the contacting part.

10. The method of manufacturing an accumulator vessel as in claim 9, wherein the sealing member is press-fitted into the first end of the rod member.

11. The method of manufacturing an accumulator vessel as in claim 9, wherein the sealing member is screwed into the first end of the rod member.

12. An accumulator vessel comprising:

a body member that is formed with an accumulator chamber hole providing a first opening and a second opening and is formed with a contacting part in the accumulator chamber hole near the first opening; and a sealing member that is disposed in the accumulator chamber hole and contacts the contacting part from the second opening side of the accumulator chamber hole so that the sealing member closes the first opening of the accumulator chamber hole.

13. The accumulator vessel as in claim 12, wherein the contacting part is a surface facing the second opening side of the accumulator chamber hole.

14. The accumulator vessel as in claim 12, wherein:

the body member provides a plurality of branching parts arranged in a line;

the respective branching parts provide fuel passages that branch from the accumulator chamber hole; and the accumulator chamber hole extends along the plurality of branching parts.

15. The accumulator vessel as in claim 14, wherein:

the accumulator chamber hole has a first part that has a given internal diameter and extends along the plurality of branching parts, and a second part that is disposed in the first opening side from the first part and has a smaller internal diameter than the first part; and the contacting part is disposed between the first and second parts of the accumulator chamber hole.

16. The accumulator vessel as in claim 12, wherein the contacting part is formed in an annular shape.

17. The accumulator vessel as in claim 12, wherein the sealing member has a sealing part that contacts the contacting part and a restraining part that is fastened to the body member.

18. The accumulator vessel as in claim 17, wherein:

the accumulator chamber hole has a large diameter part that has a given internal diameter in the second opening side from the contacting part and a reduced diameter part that is disposed between the contacting part and the large diameter part and has a smaller internal diameter than the given diameter; and the restraining part of the sealing member is fastened to the reduced diameter part.

19. The accumulator vessel as in claim 18, wherein the sealing member conceals the reduced diameter part.

20. The accumulator vessel as in claim 12, wherein the accumulator chamber hole is straight.

* * * * *